Sept. 4, 1934.  C. D. McCARTHY  1,972,850
TAPE DISPENSER
Filed June 12, 1931  2 Sheets-Sheet 1

Inventor
Charles D. McCarthy

By Horace Fischer
Attorney

Sept. 4, 1934.  C. D. McCARTHY  1,972,850

TAPE DISPENSER

Filed June 12, 1931  2 Sheets-Sheet 2

Inventor
Charles D. McCarthy
By Howard Fletcher
Attorney

Patented Sept. 4, 1934

1,972,850

UNITED STATES PATENT OFFICE 1,972,850

TAPE DISPENSER

Charles D. McCarthy, St. Paul, Minn., assignor to Minnesota Mining & Manufacturing Company, St. Paul, Minn., a corporation of Minnesota Application June 12, 1931, Serial No. 543,790

21 Claims. (Cl. 242—55.2)

This invention relates to a tape dispenser having a construction to support a roll of tape and is particularly adapted to handle a tape having an adhesive surface of a non-drying nature. Tape of this character would be ordinarily difficult to handle in a dispenser, however, with the structure of my dispensing device I am able to support a tape of this character and readily dispense it into the desired lengths so that it may be used for any purpose.

The device is of a simple nature having a standard projecting up from a base portion which supports the roll forming the supply of tape. From this roll the tape is adapted to pass down over a series of freely disposed wheels which are slightly spaced apart and which co-operate and intermesh with a series of toothed wheels which are also freely disposed and spaced apart. The first series of wheels are spaced closely to the toothed series of wheels and interfit with the same so that when the tape is carried down from the supply roll over the first series of wheels, it can then be passed over to the toothed wheels, and from the toothed wheels it is carried along a dispensing table which may incline upwardly from these series of wheels. Each series of wheels has a narrow or thin formation with a washer-like character and while the tape extends around the first series of wheels and adheres to the periphery over which it extends, the toothed wheels are provided with points forming the teeth of these wheels so that only a very slight contact is made on the adhesive surface of the tape. The toothed wheels act to disengage the tape from the first series of wheels and to cause the tape to be dispensed out along the dispensing platform freely in the operation of my tape dispenser.

The tape dispensing device may be provided with one or more operating handles so that by pressing the handle a certain length of tape may be drawn from the supply roll and dispensed out along the platform on which the tape slides from the carrying wheels. I have illustrated this dispensing device with two operating handles, one of which will give a longer length of tape than the other. The handles operate a ratchet mechanism to operate the two sets of wheels which carry the tape from the supply roll onto the dispensing table. From there the tape may be removed and cut off by tearing it against the projecting sharp edge of the dispensing table.

Heretofore devices have been provided for dispensing tape and ordinarily this tape was provided with a dry adhesive on one surface thereof. In these devices it was necessary to provide a form of moistening means so that as the tape was drawn from the supply roll it could be passed over the moistening device or means and then torn off ready for use. In my device I have provided a structure which is capable of dispensing a tape having the peculiar nature where the adhesive surface is of a non-drying nature and where no moisture is required, so that the tape may be carried out off of the supply roll in suitable lengths, ready for use for the purposes desired.

A tape of this character has been found to be very desirable as it overcomes the necessity of having any moisture in connection with the dispenser and there is no need of continually keeping the moisture compartment filled, making it only necessary to place a supply of this peculiar adhesive tape upon the supporting standard of this device and by the operation of suitable lever means the tape is automatically brought out, ready for use with the adhesive side upward and the smooth side of the tape downward, so that it will slide freely along a dispensing table or platform. In this manner I provide a very desirable device for handling tape of this character.

In the drawings forming part of this specification:

My tape dispenser A is designed to provide a simple device which operates to support a roll of tape B between the standards 10 which project up from the sides of the dispenser A to support the tape so that it may be conveniently positioned on a suitable shaft 11 carried in the upper end of the standards 10. A slot 12 is provided so that the shaft 11 may be removed and a new roll of tape B placed thereon when it is desired.

Figure 1:
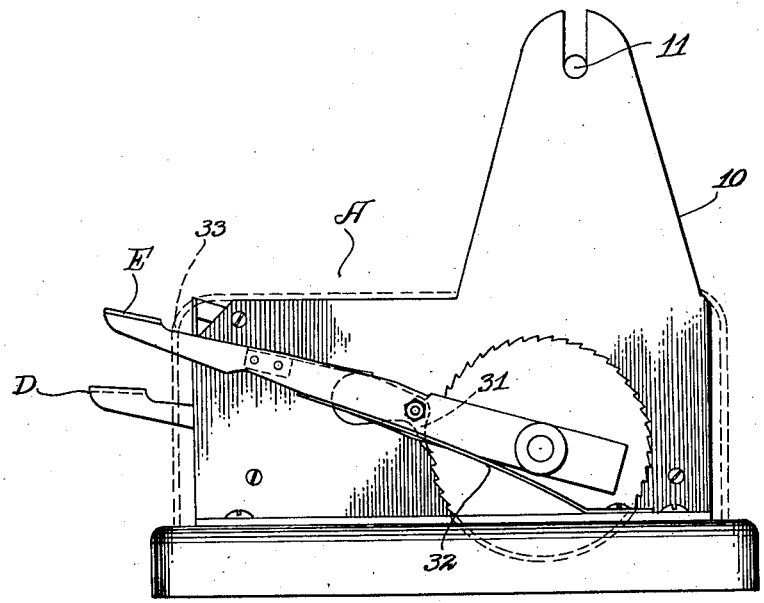
Figure 1 is a side view showing one side of my tape dispenser and illustrating in dotted outline the ratchet mechanism for one of the operating levers.
Figure 2:
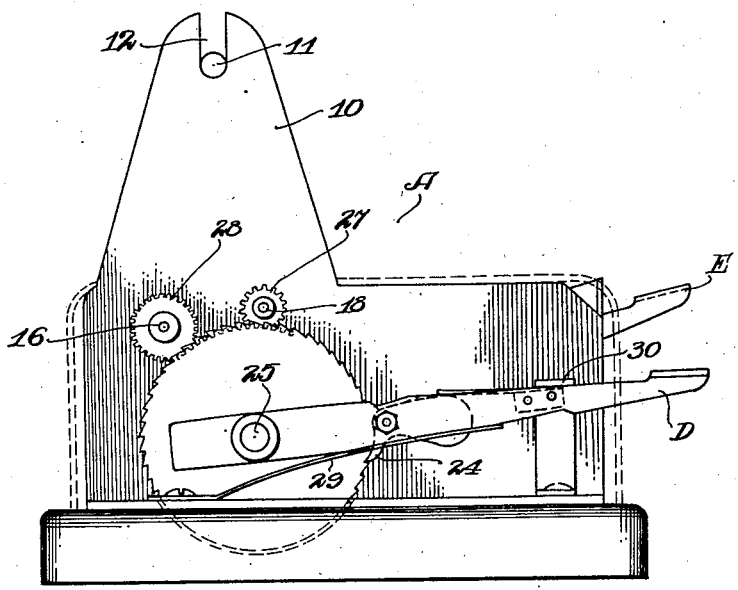
Figure 2 illustrates the other side of the tape dispensing device showing the other operating lever and illustrating in dotted outline the ratchet operation of the lever as well as the gears connecting the other parts with the main operating shaft.
Figure 3:
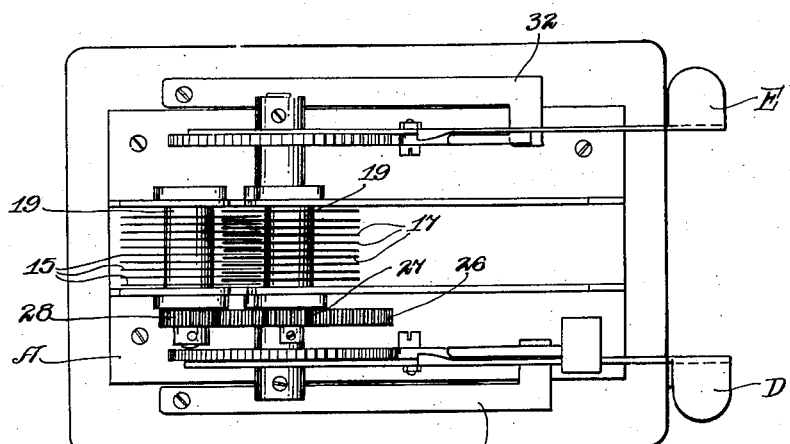
Figure 3 is a plan view with a portion removed to illustrate the operating levers, ratchets, and the gears connecting the pairs of dispensing wheels.
Figure 4:
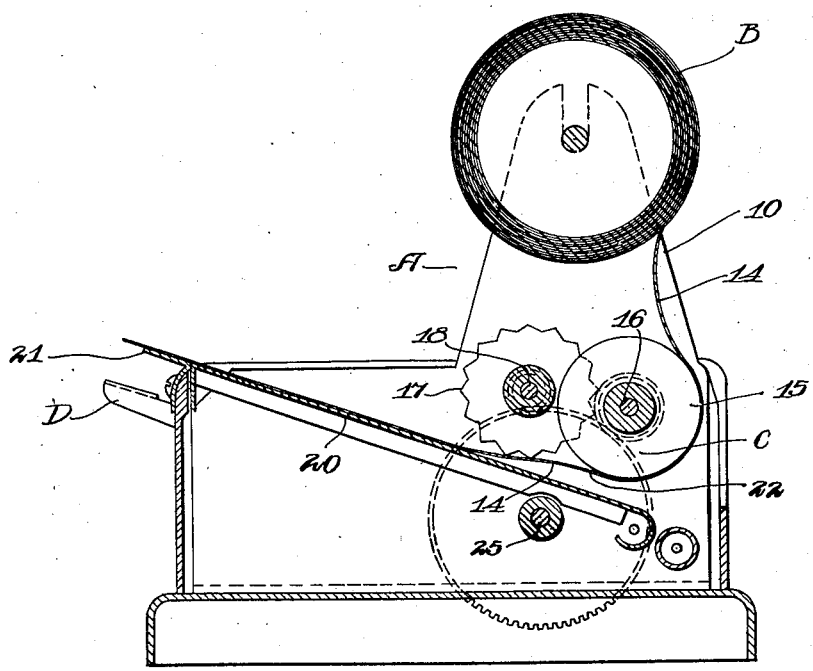
Figure 4 is a sectional side elevation of my tape dispensing device.
Figure 5:
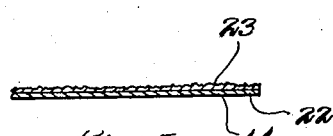
Figure 5 is an enlarged sectional side elevation of a piece of the tape used in this dispenser.

The tape B is of a character wherein the adhesive surface is of a non-drying nature. This is peculiarly different from the ordinary tape used for sealing packages or other purposes and in a tape of this nature it is not necessary to have a moisture pan, brush, or wheel, but the tape may be carried from the roll B in the strip 14 down around the wheels 15 which are supported on the shaft 16 and from the wheels 15 to the toothed wheels 17 which are supported on the shaft 18. The wheels 15 are of a thin sheet-like character as illustrated in Figure 3, and are adapted to intermesh between the wheels 17 which are of the same thin character but which are formed with a toothed periphery, the purpose of which will be later set forth. Both of the series of wheels 15 and 17 are loosely disposed between suitable spacers such as 19 carried on the respective shafts 16 and 18, however, these wheels 15 and 17 are caused to rotate with the shafts 16 and 18, respectively, when the dispensing device A is operated as will be hereinafter more fully described. The supporting of the wheels 15 and 17 loosely between the spacers 19 permits the same to rotate without binding and also permits the driving of the tape strip 14 freely from the supply roll B without pulling the strip of tape out of line as it is carried by the dispensing wheels 15 and 17. The set of wheels 15 which intermeshes with the set of wheels 17 conduct the tape carrying means C which carry the tape from the roll B and slide it along the dispensing platform 20. The platform 20 inclines upwardly from beneath the carrying means C extending between the sides of the dispenser A and provided with a cutting edge 21 on the forward upper end of the same which permits the tape to be torn off or cut when removing it from the table 20.

The strip of tape 14 may be of any suitable width and the dispenser A may be built accordingly to accommodate different widths of tape so that the same may be dispensed out of the machine A when it is desired. This strip of tape 14 has the peculiar character of having a smooth surface 22 on one side and a non-drying sticky adhesive surface 23 on the other side. To handle tape of this character I have designed the dispenser A, and the set of carrying wheels 15 operate to carry the strip of tape 14 around into position so that it may be projected out on the table 20 with the smooth surface 22 next to the table. The series of wheels 17 intermesh with the wheels 15 and the points of the teeth on these wheels act to disengage the tape 14 from the wheels 15, touching only a very small surface of the tape, in fact, so small, that only sufficient contact with the sticky surface 23 of the tape 14 is made by the wheels 17 to carry the tape up along the table 21. The weight of the tape acts to disengage the same from the wheels 17 and thus the tape slides up along the table 20 and is ready to be used by cutting it off on the edge 21.

The dispenser A is operated by the hand levers D and E to move the tape from the roll B onto the table 20. The handle D operates the ratchet pawl 24 which rotates the shaft 25 and through the driving gear 26 and the pinions 27 and 28, the shafts 16 and 18 are operated so that the wheels 15 and 17 may be rotated to carry the strip of tape 14 around the same and onto the table 20. The lever D is held in upward position by a spring 29 against the shoulder 30. This lever D operates to carry a short strip of tape 14 forwardly on the table 20 when the lever is depressed.

The lever E is positioned on the opposite side of the machine A to the lever D. This lever operates the ratchet pawl 31 and is held in upper position by the spring 32 against the end of the slot 33. The lever E projects up higher than the lever D so as to give a longer throw to the same and when this lever is operated a longer strip of tape 14 is carried out onto the table 20. Obviously, either of the levers D or E may be pressed several times to dispense a longer piece of tape 14 when it is desired, so that any suitable length of tape may be carried from the roll B to the dispensing table 20.

The operation of the tape dispenser A is simple, yet very effective and unique in carrying tape with a non-drying sticky adhesive surface, like 23, out onto a dispensing table with the tape lying virtually flat thereon so that it may be easily engaged and used for any desired purpose. With a dispensing device of this nature an adhesive tape of the character set forth may be more easily handled than if it were just pulled off of the roll and without wasting the tape and also carrying the tape away from the roll more easily so that at each operation of either of the levers D or E, a pre-determined amount of tape may be dispensed from the roll B, readily accessible on the table 20. Thus by my dispenser A I provide a very simple and effective means of handling a non-drying adhesive tape which ordinarily is difficult to handle, owing to its sticky adhesive surface.

The machine A is designed so that the dispensing wheels 17 rotate faster than the traction wheels 15. The traction wheels 15 have a greater gripping face to the adhesive surface of the tape 14 than the dispensing wheels 17, or in other words, the tape is carried by the traction wheels with a strong gripping surface and then the gripping or engaging surface of the wheels 17 is considerably diminished from the gripping surface of the wheels 15 so that the wheels 17 act like kickers in their faster rotation and mere point engagement with the tape causes the tape to be carried out onto the dispensing table 20. Thus the dispensing wheels in their faster rotation will free the tape from the traction wheels 15 and virtually kick it off onto the table 20.

This tape 14 is made of paper, which may have a crepe-like nature or a transparent nature, or any other similar nature, where one surface is covered with non-drying adhesive material with the other surface smooth. Adhesive tape of a cloth nature may also be handled in this manner, so that it can be removed from the roll when desired, in suitable pre-determined lengths. This dispensing device A is primarily for the purpose of providing a dispenser for the paper tape rather than the cloth adhesive tape, nevertheless, it may be used for the regular adhesive tape if it is desired.

The simple character and efficient operation is of primary importance in handling a non-drying adhesive tape so that it may be used freely commercially for holding packages together or in any other suitable manner in the dispensing of tape of this nature which ordinarily is awkward to handle because of its sticky nature which causes it to adhere to anything it touches, making it hard to handle when removing it from the supply roll.

In accordance with the patent statutes I have described the principles of operation of my device for dispensing non-drying adhesive tape and while I have illustrated a particular formation and construction, together with the arrangement of the parts, I desire to have it understood that the same is only suggestive and that other means may be provided within the scope of the following claims which accomplish the purpose and intent herein set forth.

I claim:

1. A tape dispenser including, a support for a roll of tape, a series of slight relatively movable transversely thin tape carrying wheels over which the adhesive surface of the tape is adapted to travel, a series of thin toothed disengaging wheels associated with said first wheels adapted to carry the adhesive tape off of said first wheels, a tape receiving table, lever means for operating said device to dispense a pre-determined length of adhesive tape from the supply roll and means operated by said lever to rotate both of said series of wheels.

2. A tape dispenser for adhesive tape including, a support for the supply roll of tape, carrying wheel means adapted to draw the adhesive tape from the supply roll, a tape receiving table, selectively operable lever means for carrying said tape over said carrying wheels and onto said table with the smooth surface of the tape sliding on the table and the adhesive surface upward and ratchet means associated with said lever means to dispense the tape from the supply roll in pre-determined lengths.

3. A dispenser for a non-drying sticky surfaced tape including, a support for the supply roll, a series of pairs of thin wheels positioned adjacent each other and interfitting, one of said pairs acting as carriers and against which the adhesive surface of the tape is adapted to engage, and the other pair of wheels acting as tape removers, gear means for operating said pairs of wheels in unison, and means for receiving the adhesive tape on a dispensing table, and a cutting edge on said table.

4. A tape dispenser for non-drying adhesive tape including, a supporting member for the supply roll of tape, and selectively operable means each for carrying said tape from said roll in one of a number of pre-determined lengths projecting to be engaged and removed from the dispenser.

5. A tape dispenser for non-drying adhesive tape having, a tape carrying means including a series of thin wheels spaced apart, a second series of thin wheels interfitting with said first series of wheels, each of said series of wheels being loosely carried for slight transverse relative movement on the carrying means, means for rotating said series of wheels in unison, said second series of wheels having a nature to disengage the adhesive surface of the tape from said first series of wheels, and a platform on which the tape is adapted to slide as it is disengaged from said first series of wheels by said second series of wheels.

6. A device for handling a sticky surfaced tape, means for supporting a roll of the tape, a series of means each presenting progressively diminishing engaging surfaces for carrying the tape in a strip from the roll in a manner to slide the same out into position to be used, and means for operating said carrying means.

7. A device for handling tape having an adhesive surface which does not require moistening before use, means for supporting a roll of the tape, carrier wheels having a thin nature, means for supporting said wheels rotatable and spaced apart, the outer surface of said wheels having the same diameter, a series of wheels positioned adjacent said first wheels and having a thin, flat nature and adapted to fit between said first wheels, said last mentioned wheels having their outer periphery formed with points, gear means for operating both of said series of wheels in unison, whereby tape is carried from the roll over the first set of wheels which act as carriers and said second set of wheels acting as removing means to remove the tape from the first wheels, and a platform onto which the tape is adapted to slide from said second wheels.

8. A device for handling tape having an adhesive surface of a non-drying nature, means for carrying the tape in a strip from the roll, said means including a series of carrying wheels loosely mounted with considerable play upon a supporting shaft, spacers between said wheels, a second set of wheels adapted to interfit with the first set of wheels loosely mounted on another shaft, means for spacing said second set of wheels apart, said first set of wheels acting as carriers for the strip of tape from the roll and said second set of wheels acting as removers to disengage the tape from said first set of wheels, means for rotating said wheels in unison, and means for limiting the rotation of said wheels at each operation.

9. A device for handling a sticky surfaced tape, means for supporting a roll of the tape, means for carrying the tape in a strip from the roll by engaging the sticky surface of the tape and carrying the tape from the supply roll to a platform onto which the tape is delivered ready for use, and a pair of operating handles adapted to move said carrying means for the tape to different pre-determined movements to eject a long or short piece of tape from said device.

10. A device for handling tape with an adhesive surface of a non-drying nature including a support for a supply roll of the tape, and selectively operable means for carrying the tape from the supply roll to a position to be engaged and used, each of said means dispensing a pre-determined length of tape, said carrying means engaging against the non-drying surface of the tape, and a cutting edge over which the tape projects to cut the same off into various predetermined desired lengths.

11. A tape dispenser for adhesive tape including, means for supporting a supply roll of tape, carrier means for removing the tape from said supply roll, means for operating said carrier means, and means operating at a higher speed than said carrier means for removing the tape from said carrier means.

12. A tape dispenser for adhesive tape including, a support for a roll of tape, carrying means having a small contact area adapted to draw the tape from the tape roll, means having a smaller contact area adapted to remove the tape from said carrying means, and means for operating the last named means at a higher rate of rotation than said carrying means to remove the tape from said last named means.

13. A tape dispenser for adhesive tape including, a support for a supply roll of tape, a carrier member for removing the tape from the supply roll, stripping means, and means for operating said stripping means at a greater speed than said carrier member to remove the tape from said member.

14. A tape dispenser including, a casing, means for supporting a supply roll of tape to be dispensed, means for pulling the tape from the supply roll, said means including a diminishing contacting engagement with the adhesive surface of the tape.

15. A dispenser for tape including, means for supporting a supply roll of adhesive tape, a series of progressively diminishing surfaced means for pulling the adhesive tape from the supply roll for engagement with the adhesive surface of the tape, and means for operating said dispenser to dispense tape therefrom as desired.

16. A dispenser for adhesive tape including, a supporting means, a series of pulling rolls for engaging the adhesive surface of the tape, and means for operating said rolls at different speeds increasing progressively in the travel of the tape to pull the tape from the supply roll and dispense it by a final kicking operation which carries the tape freely out of said dispenser.

17. A tape dispenser having a casing, means for removably supporting a supply roll of adhesive tape within said casing, a series of pulling rolls, each overlapping the previous pulling roll, and means for pulling the tape from the supply roll adapted to carry the adhesive tape freely out of said dispenser in a comparatively flat state.

18. A dispenser for adhesive tape including, a casing adapted to removably support a supply roll of adhesive tape, a series of progressively diminishing surfaced means for engaging the adhesive surface of the tape to pull the same from the supply roll and carry it out of said tape engaging means.

19. A dispenser for adhesive tape having means for supporting a roll of said tape, a series of pulling rolls each formed of a series of spaced discs, means for supporting said discs in a manner so that the discs of one roll intermesh with the discs of the next adjacent roll, and means for mounting said discs with free lateral play to cause the same to be self-aligning with said tape passing over the same and to overcome uneven pulling of the tape from the supply roll, and means for rotating said rolls in unison, some of said rolls operating slower than other of said rolls.

20. A draft means for drawing adhesive tape from a supply roll including, a roll having a series of discs spaced apart and freely disposed to move laterally and held keyed to rotate together, spacers between each of said discs also freely disposed to move laterally, said discs having gripping surfaces on the periphery thereof to grip the adhesive surface of the tape, and means for rotating said draft means to dispense adhesive tape by engaging the adhesive surface thereof.

21. A draft means for pulling adhesive tape from a source of supply including, a series of rolls, and means for rotating said rolls in unison, the last roll of said series past which the tape moves rotating faster than all of the other rolls, the adhesive surface of the tape being engaged by the peripheral surface of said rolls to pull and dispense it from the source of supply.

CHARLES D. McCARTHY.